United States Patent [19]

Ott

[11] 4,254,798
[45] Mar. 10, 1981

[54] DIRECTIONAL CONTROL VALVE

[75] Inventor: Helmut Ott, Stuttgart, Fed. Rep. of Germany

[73] Assignee: Herion-Werke Kg, Fellbach, Fed. Rep. of Germany

[21] Appl. No.: 2,186

[22] Filed: Jan. 9, 1979

[30] Foreign Application Priority Data

Mar. 23, 1978 [DE] Fed. Rep. of Germany ....... 2813030

[51] Int. Cl.³ .......................................... F15B 13/043
[52] U.S. Cl. ................................ 137/625.66; 91/463; 137/625.64; 137/625.68
[58] Field of Search ...................... 137/625.64, 625.66, 137/625.68; 91/463

[56] References Cited

U.S. PATENT DOCUMENTS

| | | | |
|---|---|---|---|
| 2,757,642 | 8/1956 | Raney | 137/625.68 |
| 2,912,007 | 11/1959 | Johnson | 137/625.64 X |
| 3,318,333 | 5/1967 | McCollum et al. | 137/625.69 |
| 3,574,311 | 4/1971 | Fairbanks | 137/625.68 |
| 3,661,182 | 5/1972 | Loveless | 137/625.48 |

FOREIGN PATENT DOCUMENTS

| | | | |
|---|---|---|---|
| 207983 | 4/1908 | Fed. Rep. of Germany | 137/625.68 |
| 1163104 | 2/1964 | Fed. Rep. of Germany | 137/625.66 |

*Primary Examiner*—Gerald A. Michalsky
*Attorney, Agent, or Firm*—Michael J. Striker

[57] ABSTRACT

The direction control valve comprises a housing having a stepped central boring for accommodating a sliding control piston having a section of larger diameter and a section of smaller diameter. The housing defines two load ports each communicating with an assigned boring section through an annular gap. One load port is directly connectable through its annular gap with a pressure releasing or venting port and the other load port is connectable to the same venting port through a central passage in the piston.

5 Claims, 5 Drawing Figures

DIRECTIONAL CONTROL VALVE

BACKGROUND OF THE INVENTION

This invention relates generally to directional control valves and more particularly it relates to a control valve preferably for controlling a pneumatic load, having a housing defining two load ports, a pressure port, a control port and an axially movable control piston.

In conventional directional control valves of this type having two load ports, a flow return or venting port is assigned to each load port. The disadvantages of such known structure is a relative complexity of the design and an increased length.

SUMMARY OF THE INVENTION

A general object of the present invention is to overcome the aforementioned disadvantages.

More particularly, it is an object of the invention to provide an improved directional control valve of the above-described type which is simple in design and in structure.

Another object of the invention is to provide such an improved control valve which is smaller in size.

In keeping with these objects, and others which will become apparent hereafter, one feature of the invention resides, in a direction control valve having a housing with two load ports, a pressure port and a control port and a control piston, in a combination which comprises a single venting port arranged in the housing, one of the load ports being directly connected to the venting port and the other load port being connected to the venting port through a passage in the control piston.

Preferably, the control piston is provided with an axial boring communicating at one end thereof with the venting port and at its other end with a radial boring which in one position of the piston is brought in connection with the other load port and in another position of the piston is shut off from this other load port.

In an advantageous embodiment the housing of the valve has a central boring for slidably guiding the control piston. The pressure port opens into the center boring whereby each load port communicates with the central boring through an annular recessed channel and each recessed channel cooperates with a sealing edge of the control piston which during the axial movement of the latter seals or unseals the corresponding annular channel.

The clearance of each annular channel in axial direction is smaller than the contact surface of the sealing section of the control piston in the boring of the housing so that undercutting is prevented.

The control valve of this invention is made preferably with a differential piston having sections of different diameter.

In a further elaboration of this invention the effective venting cross-section of the longitudinal or axial boring in the control piston is varied by means of a throttling bolt which is adjustable in axial direction relative to the orifice of the axial boring in the piston.

In order to enable mutually independent throttling of both load ports, the end of the control piston facing the venting port is provided with an axial projection defining between the housing and the control piston an annular venting orifice which is adjustable by means of an axially movable throttling ring.

The throttling ring can be connected with a threaded disk which is screwed in the housing and has a central boring for receiving the throttling bolt. The disk is thus axially adjustable relative to the housing and the throttling bolt is axially adjustable relative to the disk.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
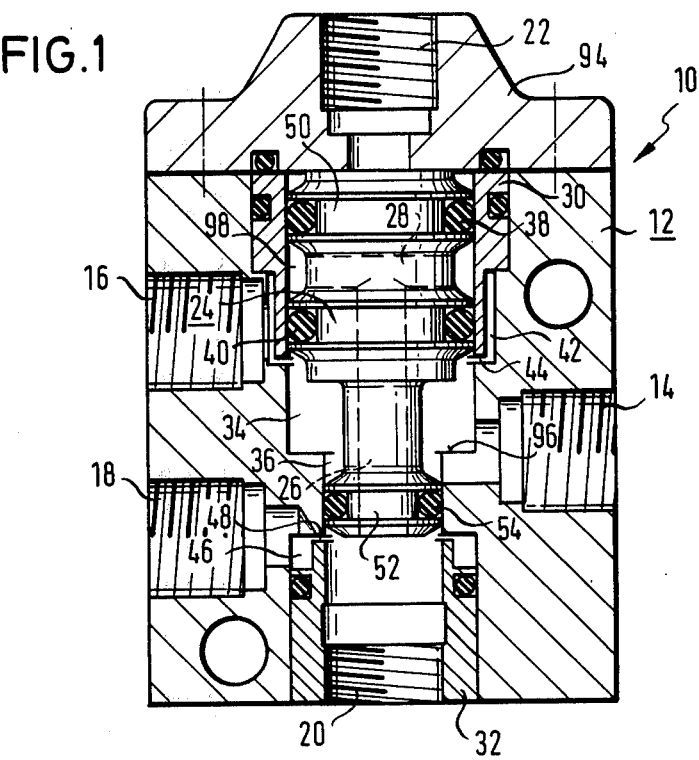
FIG. 1 is a side view partly in section of the valve of this invention in one of its switching positions.
Figure 2:
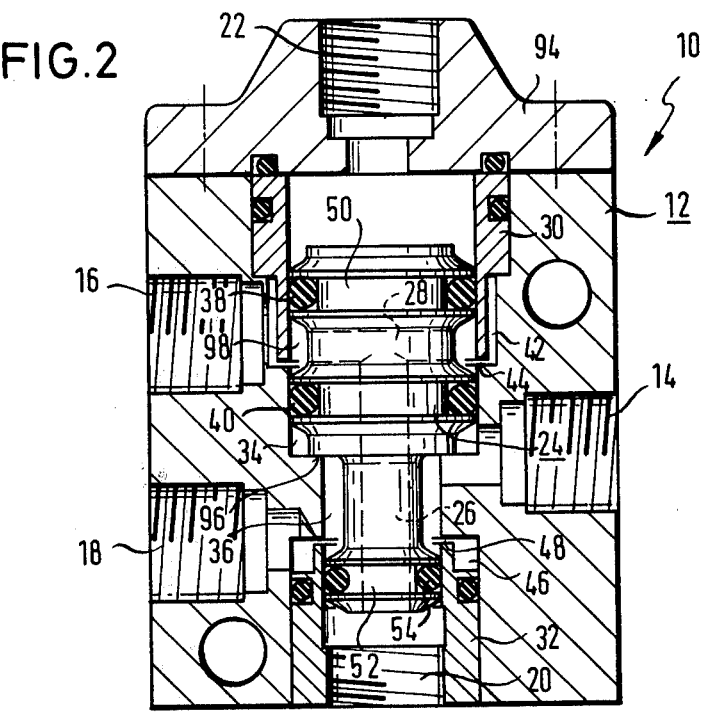
FIG. 2 is the device of FIG. 1 shown in another switching position.

Referring firstly to FIGS. 1 and 2, the directional control valve of this invention has housing 12 provided with pressure port 14, a first load port 16, a second load port 18, a flow return or venting port 20 and a control port 22. Housing 12 further has a central axial boring 34 and 36 in which sliding control spoon or piston 24 is guided for axial movement in two opposite directions between a first switching position as shown in FIG. 1 and a second switching position as shown in FIG. 2. The upper section 34 of the axial boring in housing 12 has a larger diameter than the lower section 36. Accordingly, control piston 24 has two piston sections 50 and 52 of which the upper piston section 50 has a larger diameter than the lower piston section 52. The upper boring section 34 is provided with bushing 30 of the same inner diameter and the upper section 50 of control piston is arranged for movement in the brushing 30 and in the boring section 34 between an end plate 94 and step 96 of the lower boring section 36 of smaller diameter. Similarly as in the upper boring section, the lower boring section 36 continues with a lower bushing 46 in which piston section 52 of smaller diameter is guided.

Each piston section 50 and 52 is provided with sealings, for example the upper piston section is provided with sealing rings 38 and 40 and the lower piston section with sealing ring 54.

The intermediate portion of the upper piston section 50 between sealing rings 38 and 40 is recessed to form an annular chamber 98 and is provided with a radial boring 28 communicating with an axial blind boring 26 which extends through the lower piston section 52 and opens into venting port 20.

An annular channel 42 is formed between housing 12 and bushing 30 and communicates through an annular gap 44 with the upper boring section 34. Similarly, a portion of the outer wall of the lower bushing 32 is spaced apart from housing 12 to form an annular channel 46 which communicates through annular gap 48 with the lower boring section 36.

Figure 3:
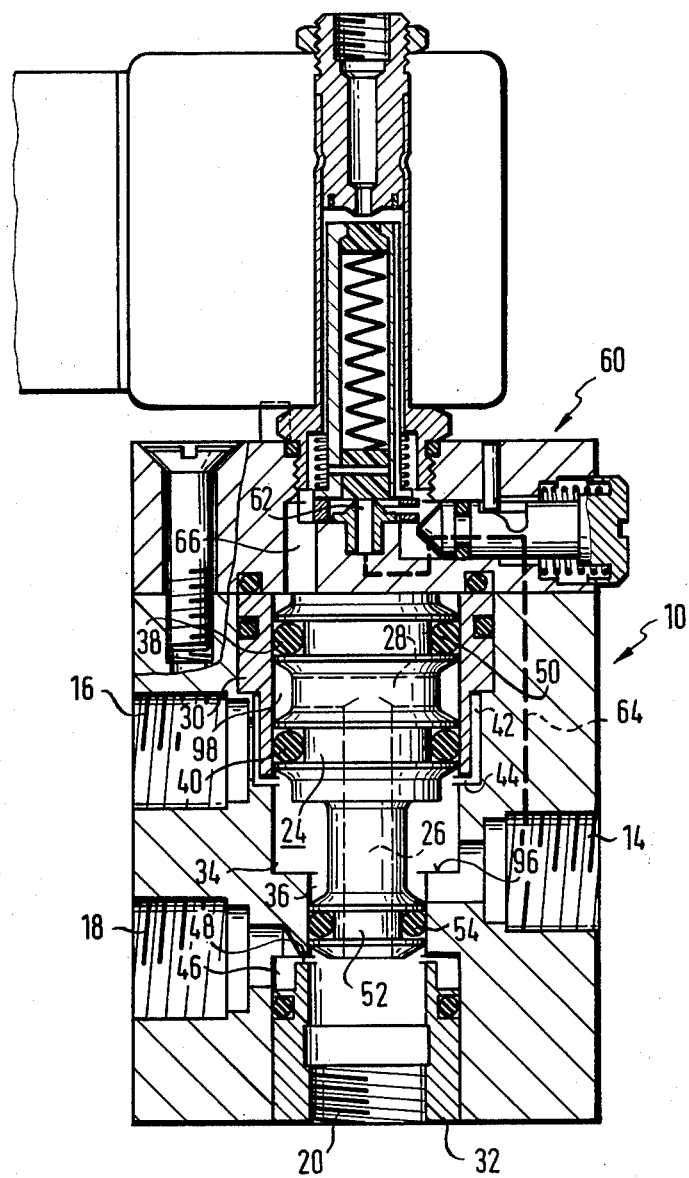
FIG. 3 is a modification of the device of FIG. 1 with electromagnetic preliminary control means.

As shown in FIG. 3, the directional control valve of this invention can be equipped with an electromagnetically operated preliminary control valve 60 having a valve seat 62 which communicates through channel 64 with pressure port 14. The admission of pressure fluid against control piston 24 takes place after the opening of valve seat 62 through boring 66 in the housing of preliminary control valve 60. Boring 66 opens in the central boring 36 of housing 12 of the directional control valve. In FIG. 3, the position of control piston 24 corresponds to the position as shown in FIG. 1. The operation and structure of the electromagnetically operated preliminary control valve is well known in the art and need not be further explained.

Figure 4:
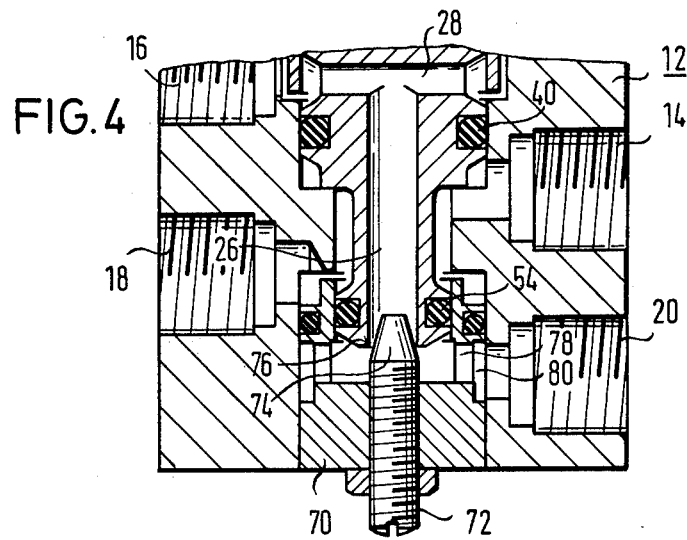
FIG. 4 is a sectional side view of a cut-away part of another modification of the device of this invention shown in position of FIG. 2.

FIG. 4 shows a modification of the directional control valve of this invention in which load port 16 is throttled by means of throttling bolt 72. The trip 74 of bolt 72 cooperates with edge 76 of axial boring 26 in the control piston to throttle the passage from load port 16 to venting port 20.

The venting port 20 in this embodiment extends radially relative to the center boring of housing 12 and lower bushing 32 is replaced by a closed bushing 70 closing the lower part of central boring in housing 12. The bottom of bushing 70 is provided with a central threaded hole engaging throttling bolt 72 so that the throttling action of the latter can be adjusted. Venting port 20 communicates with the lower part of central boring via a radial boring 78 and an annular channel formed between bushing 70 and housing 12.

Figure 5:
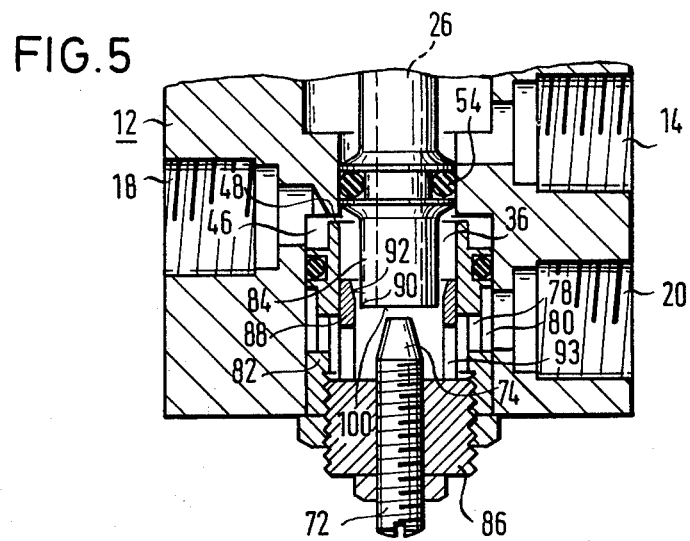
FIG. 5 is a side view, partly in section of a cut-away part of still another modification of the device of this invention shown in the position of FIG. 1.

FIG. 5 shows an embodiment of directional control valve of this invention in which both load ports 16 and 18 can be pressure released through a throttle independently from one another.

Instead of lower bushing 32, the lower section of the axial boring in the housing has a bushing 82 provided with an internal thread into which is screwed a threaded disk 86 supporting an inwardly projecting throttling collar 88, the upper portion of the inner wall of the collar being bevelled into the form of a tapering surface 92 which cooperates with the edge 90 of the lower end of piston 24 which in this embodiment is in the form of tubular projection 84.

Threaded disk 86 has a central boring provided with internal threads for engaging throttling bolt 72. The frustoconical top surface 74 of the bolt cooperates with axial boring 26 in the control piston 24 which cooperates with the first load chamber or port 16 similarly as in the preceding embodiment.

The operation of the directional control valve of this invention is as follows:

In the position as illustrated in FIG. 1 control port 22 is pressure released whereas pressure medium enters through pressure port 14, the central boring 34 and 36 in housing 12. Since the upper section 50 of piston 24 has a larger diameter than the lower piston section 52 the pressure medium pushes the whole control piston 24 upwardly into the position as illustrated in FIG. 1 in which the upper end of piston 24 abuts against the end plate 94. In this position load port 16 which opens into annular channel 42, communicates through annular slit 44 and through boring 34 with pressure port 14.

The other load port 18 directly communicates through ring channel 46 and the annular slit 48 with the venting port 20 which in this embodiment forms a coaxial extension of the central boring 36. Accordingly, load port 18 is pressure-released through the venting port 20.

If pressure is admitted into control port 22, control piston 24 is switched over to move into the position as shown in FIG. 2 in which the upper section 50 of the piston rests on shoulder or step 96 in the central boring. Step 96 is formed between the upper boring section 34 and the lower boring section 36 of smaller diameter.

During the downward movement of piston 24 sealing ring 40 runs over the annular gap 44 and sealing ring 54 travels over the annular gap 48. As a consequence load port 18 is connected through the annular channel 46 and the annular gap 48 to the central boring section 36 and through the latter to the pressure port 14. Inlet pressure from port 14 is thus admitted into load port 18.

Load port 16, in contrast, is pressure-released through the annular channel 42, annular gap 44, radial boring 28 and the axial boring 26 in control piston 24 leading to venting port 20.

Both sealing rings 40 and 38 as illustrated are in this position situated at both sides of the radial boring 28 and the annular recess 98 formed in the periphery of the piston in the range of radial boring 28 communicates in the position of FIG. 2 with annular gap 44 leading to load port 16.

The structure of the directional control valve of this invention as illustrated in FIGS. 1 and 2 enables pressure release of both load ports 16 and 18 through the same venting port 20 which if desired can be located in the side wall of the valve housing 12 as shown by way of an example in FIGS. 4 and 5.

FIG. 3 shows as mentioned above, an example of the valve of this invention provided with an electromagnetically operated preliminary control valve 60 which is arranged in place of control port 22. Piston 24 is displaced in a conventional manner by means of pressure fluid admitted through the valve 60.

In FIG. 4, load port 16 is pressure-released through radial and axial borings 28 and 26 provided in piston 24 whereby the axial boring 26 is throttled by conical tip 74 of adjustable throttling bolt 72. Venting port in this embodiment is arranged laterally in housing 12. The adjustable gap between the conical surface 74 and the control edge 76 of the piston is adjustable by screwing the throttling bolt 72 in the bottom of bushing 70.

In the position of the control piston 24 as illustrated in FIG. 4 (which corresponds to the position in FIG. 2), load port 16 communicates with venting port 20 via radial boring 28, axial boring 26, the throttling gap between the tip 74 and edge 76 and through radial channel 78 and annular chamber 80.

FIG. 5 illustrates a modification of the valve of this invention shown in a position corresponding to FIG. 1. In this embodiment both load ports 16 and 18 are throttled independently from each other. The throttling of load port 16 is effected in the same manner as in FIG. 4 by means of throttling bolt 72 which according to its adjustment changes more or less the cross-section of the throttling gap 100 between the conical tip 74 and the inner edge of radial passage 26 in piston 24.

By screwing or unscrewing the threaded bottom disk 86 in the lower bushing 82 the position of throttling ring 88 is changed relative to control piston 24 namely to its edge 90 so that between the conical surface 92 of throttling ring 88 and the edge 90 of the tubular projection at the end of piston 24 a more or less strong throttling effect takes place proportionally to the size of the adjusted throttling gap.

Accordingly, load port 18 is connected to venting port 20 through annular channel 46, annular gap 48, lower section 36 of the boring in the housing and through the throttling area between the throttling ring 88 and the edge 90 and further through boring 93 created in throttling ring 88, boring 87 in bushing 82 and the annular channel 80 in the wall of the housing.

In adjusting the throttling elements, there is first turned the threaded disk 86 to adjust the desired throttling position of ring 88 for load port 18 and thereupon is turned throttling bolt 72 for adjusting the throttling effect in load port 16.

It will be understood that each of the elements described above, or two or more together, may also find a useful application in other types of constructions differing from the types described above.

While the invention has been illustrated and described as embodied in a directional control valve for use with pneumatic working medium, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention.

What is claimed as new and desired to be protected by Letters Patent is set forth in the appended claims:

1. In a direction control valve, particularly for use in connection with a pneumatic load, a combination comprising a housing having a first load port, a second load port, a pressure port and a control port and formed with a central opening; a control piston movable in said opening along said ports; a single venting port, said control piston having an end portion, and being formed with an axial boring adapted to communicate with said venting port and a radial boring arranged in communication with said axial boring and adapted to communicate with one of said load ports to connect the same with said venting port, a channel defined by said axial boring adapted to connect said second load port with said venting port; and throttling means including an adjustable throttling bolt, said end portion of said control piston being provided with a tubular projection with an outer edge facing said throttling bolt and having a central passage being in axial alignment with said axial boring, and further including an axially displaceable throttling collar cooperating with the outer edge of said tubular projection to produce an adjustable gap for said second load port.

2. The combination as defined in claim 1, wherein said central opening defines two sections of different diameters, and said control piston is a differential piston having one part of larger diameter and another part of a smaller diameter, said diameters of said control piston corresponding to said diameters of said sections, each section having an annular gap communicating with an assigned load port, each part of said control piston having on its periphery sealing means arranged for cooperation with respective annular gaps to open one load port and close the other load port.

3. The combination as defined in claim 2, wherein the clearance of each annular gap in axial direction is smaller than the contact area of said sealing rings with said central boring.

4. The combination as defined in claim 1, wherein said housing is provided with a threaded element for supporting said throttling collar, said threaded element having a central passage aligned with the passage of said tubular projection and being provided with internal threads for engaging said throttling bolt.

5. The combination as defined in claim 1, wherein said throttling bolt has a conical tip for adjusting with the inner edge of said tubular projection a throttling passage.

* * * * *